(12) United States Patent
Chihara et al.

(10) Patent No.: US 10,469,350 B2
(45) Date of Patent: Nov. 5, 2019

(54) NETWORK SYSTEM AND CONTROL METHOD OF A NETWORK SYSTEM, AND A CONTROL DEVICE

(71) Applicant: Seiko Epson Corporation, Tokyo (JP)

(72) Inventors: Kazunori Chihara, Matsumoto (JP); Junichi Yoshizawa, Matsumoto (JP); Koichiro Tsutsumi, London (GB)

(73) Assignee: Seiko Epson Corporation, Tokyo (JP)

( * ) Notice: Subject to any disclaimer, the term of this patent is extended or adjusted under 35 U.S.C. 154(b) by 63 days.

(21) Appl. No.: 15/139,993

(22) Filed: Apr. 27, 2016

(65) Prior Publication Data

US 2016/0323419 A1 Nov. 3, 2016

(30) Foreign Application Priority Data

Apr. 30, 2015 (JP) .................. 2015-092865

(51) Int. Cl.
  *H04L 12/26* (2006.01)
  *H04L 29/08* (2006.01)

(52) U.S. Cl.
  CPC ...... *H04L 43/0852* (2013.01); *H04L 67/1095* (2013.01)

(58) Field of Classification Search
  CPC ........ G06F 3/1205; G06F 3/121; G06F 3/122; G06F 3/1222; G06F 3/1234; G06F 3/1236; G06F 3/1238; G06F 3/1268; G06F 3/1289; G06F 3/1288; G06F 3/1204; G06F 3/1203; G06F 3/1228; G06F 3/1232; G06F 3/126; G06F 3/1206; H04L 12/4641; H04L 29/06; H04L 29/12415; H04L 29/125; H04L 29/12509; H04L 29/12528; H04L 29/12537; H04L 63/0236; H04L 63/0853; H04L 63/0892; H04L 67/26; H04L 67/2819; H04L 9/32; H04L 9/3247; H04L 12/2818; H04L 67/025; H04L 67/08
  See application file for complete search history.

(56) References Cited

U.S. PATENT DOCUMENTS

| 6,311,165 | B1 | 10/2001 | Coutts et al. |
| 6,792,558 | B2 | 9/2004 | Kuwako et al. |
| 7,349,884 | B1 | 3/2008 | Odom et al. |

(Continued)

FOREIGN PATENT DOCUMENTS

| JP | 04-114250 A | 4/1992 |
| JP | 09-091541 A | 4/1997 |

(Continued)

OTHER PUBLICATIONS

Bernstein PA. Transaction processing monitors. Communications of the ACM. Nov. 1, 1990 ;33(11):75-86.

*Primary Examiner* — Djenane M Bayard
(74) *Attorney, Agent, or Firm* — Workman Nydegger

(57) ABSTRACT

A POS terminal has a server-function unit with a server function, and a client-function unit. When able to communicate normally with the control server, the client-function unit communicates with the control server as a client of the control server, and executes processes with the control server. When unable to communicate normally with the control server 15, the client-function unit communicates with the server-function unit as a client of the server-function unit, and executes processes with the server-function unit.

17 Claims, 9 Drawing Sheets

(56) References Cited

U.S. PATENT DOCUMENTS

| | | | |
|---|---|---|---|
| 7,487,202 B2* | 2/2009 | Machida | G06F 3/1211 709/203 |
| 9,590,976 B2* | 3/2017 | Logue | H04L 63/0823 |
| 2002/0162044 A1 | 10/2002 | Kuwako et al. | |
| 2004/0017580 A1* | 1/2004 | Kuroda | G06F 3/1204 358/1.13 |
| 2004/0267546 A1 | 12/2004 | Yamada | |
| 2006/0173997 A1* | 8/2006 | Tullberg | H04L 29/12509 709/224 |
| 2008/0246986 A1* | 10/2008 | Scrafford | H04L 41/12 358/1.15 |
| 2010/0027054 A1* | 2/2010 | Reddy | H04N 1/00233 358/1.15 |
| 2011/0125566 A1 | 5/2011 | McLaughlin et al. | |
| 2013/0204727 A1 | 8/2013 | Rothschild | |
| 2014/0040014 A1 | 2/2014 | Anand et al. | |
| 2014/0040186 A1 | 2/2014 | Okamura et al. | |
| 2016/0034876 A1 | 2/2016 | Speiser et al. | |
| 2016/0323380 A1 | 11/2016 | Tsutsumi et al. | |
| 2016/0379196 A1 | 12/2016 | Kawamori et al. | |
| 2016/0380852 A1 | 12/2016 | Kawamori et al. | |

FOREIGN PATENT DOCUMENTS

| | | |
|---|---|---|
| JP | 09-330474 A | 12/1997 |
| JP | 10-255170 A | 9/1998 |
| JP | 2000-099435 A | 4/2000 |
| JP | 2002-135356 A | 5/2002 |
| JP | 2002-330132 A | 11/2002 |
| JP | 2004-139425 A | 5/2004 |
| JP | 2005-258572 A | 9/2005 |
| JP | 2009-009174 A | 1/2009 |
| JP | 2010-026609 A | 2/2010 |
| JP | 2010-124349 A | 6/2010 |
| JP | 2014-149602 A | 8/2014 |

* cited by examiner

NETWORK SYSTEM AND CONTROL METHOD OF A NETWORK SYSTEM, AND A CONTROL DEVICE

Priority is claimed under 35 U.S.C. § 119 to Japanese Application no. 2015-092865 filed on Apr. 30, 2015 which is hereby incorporated by reference in their entirety.

BACKGROUND

1. Technical Field

The present disclosure relates to a network system and a control method of a network system, and a control device.

2. Related Art

Systems in which a control device (client terminal) and servers communicate through a local area network, and the control device acquires information about the current load on the servers from the servers and determines which server to connect with based on the acquired information, are known from the literature. See, for example, JP-A-2009-9174. More recently, network systems (cloud systems) in which a server (a cloud server) connected to a global network such as the Internet executes a process in response to a request from a client have become common.

Because the control device, which is a client device, may be unable to communicate normally with the server due to a server overload or other reason in a cloud system such as described in JP-A-2009-9174, there is a need to handle such events appropriately.

SUMMARY

A system having a control server and a control device that connects to the control server through a global network according to the disclosure can appropriately handle situations in which the control device cannot communicate normally with the control server.

A network system according to the disclosure includes a control server having with a server function and configured to connect to a global network; and a control device configured to communicate with the server through the global network. The control device has a server-function unit with a server function, and a client-function unit. The client-function unit is configured to communicate with the control server as a client of the control server, and execute a process with the control server, when the client-function unit can communicate normally with the control server; and when the client-function unit cannot communicate normally with the control server, communicate with the server-function unit as a client of the server-function unit, and execute a process with the server-function unit.

Thus comprised, the control device in a system having a control server and a control device that connects to the control server through a global network can appropriately handle processing when unable to communicate normally with the control server.

In a network system according to another aspect of the disclosure, the control server stores server-side data, and the control device stores control device-side data that can be referenced by the server-function unit, and can be synchronized with the server-side data when normal communication with the control server is enabled. When able to communicate normally with the control server, the client-function unit of the control device communicates with the control server and executes a process based on the process result of the control server using the server-side data; and when not able to communicate normally with the control server, the client-function unit of the control device communicates with the server-function unit and executes a process based on the process result of the server-function unit using the control device-side data.

Thus comprised, the client-function unit can continue executing an identical process using identical data even when communication is switched from the control server to the server-function unit.

In a network system according to another aspect of the disclosure, the server-side data and the control device-side data are master databases storing transaction-related information. The client-function unit of the control device communicates with the control server and executes a transaction-related process based on the process result of the control server using the server-side data when able to communicate normally with the control server; and when not able to communicate normally with the control server, communicates with the server-function unit and executes a transaction-related process based on the process result of the server-function unit using the control device-side data.

Thus comprised, the client-function unit can continue executing an identical transaction process using identical data masters even when communication is switched from the control server to the server-function unit.

In a network system according to another aspect of the disclosure, the control device has a recording function for recording on a recording medium; and the client-function unit of the control device produces a receipt based on the transaction-related process.

Thus comprised, in a system having a control device that executes a transaction process and processes receipts, and a control server that connects to the control device through a global network, the control device can handle processing appropriately even when unable to communicate normally with the control server.

In a network system according to another aspect of the disclosure, the client-function unit of the control device monitors the communication response speed of the control server, and when the communication response speed is slower than a specific speed, determines normal communication with the control server is not possible, and switches communication from the control server to the server-function unit.

Thus comprised, the client-function unit can appropriately detect that normal communication with the control server is not possible.

In a network system according to another aspect of the disclosure, after switching communication to the server-function unit, the client-function unit of the control device monitors the communication response speed of the control server, and when the communication response speed is faster than a specific speed, switches communication from the server-function unit to the control server.

Thus comprised, the client-function unit can resume communication with the control server when normal communication with the control server is enabled.

In a network system according to another aspect of the disclosure, while communicating with the control server, the client-function unit of the control device monitors the communication response speed of the server-function unit, and when the communication response speed of the server-function unit is slower than a specific speed, does not change the communicating device.

Thus comprised, changing the communicating device unnecessarily can be prevented.

In a network system according to another aspect of the disclosure, while communicating with the control server, the client-function unit of the control device does not monitor the communication response speed of the server-function unit when the communication response speed of the control server is faster than a specific speed.

Thus comprised, unnecessarily executing the process of monitoring the communication response speed of the server-function unit can be prevented, the processor load can be reduced, and process efficiency can be improved.

Another aspect of the disclosure is a control method of a network system having a control server configured to connect to a global network and having a server function, and a control device configured to communicate with the server through the global network, wherein the control device has a server-function unit with a server function, communicates with the control server as a client of the control server and executes a process with the control server when able to communicate normally with the control server, and when unable to communicate normally with the control server, communicates with the server-function unit as a client of the server-function unit and executes a process with the server-function unit.

Thus comprised, in a system having a control server and a control device that connects to the control server through a global network, the control device can appropriately handle processing when unable to communicate normally with the control server.

Another aspect of the disclosure is a control device having: a communication unit configured to communicate through a global network with a control server having a server function; a server-function unit with a server function; and a client-function unit configured to communicate with the control server as a client of the control server and execute a process with the control server when the client-function unit can communicate normally with the control server, and when the client-function unit cannot communicate normally with the control server, communicate with the server-function unit as a client of the server-function unit and execute a process with the server-function unit.

Thus comprised, in a system having a control server and a control device that connects to the control server through a global network, the control device can appropriately handle processing when unable to communicate normally with the control server.

Other objects and attainments together with a fuller understanding of the disclosure will become apparent and appreciated by referring to the following description and claims taken in conjunction with the accompanying drawings.

DESCRIPTION OF EMBODIMENTS

A preferred embodiment of the present disclosure is described below with reference to the accompanying figures.

Figure 1:
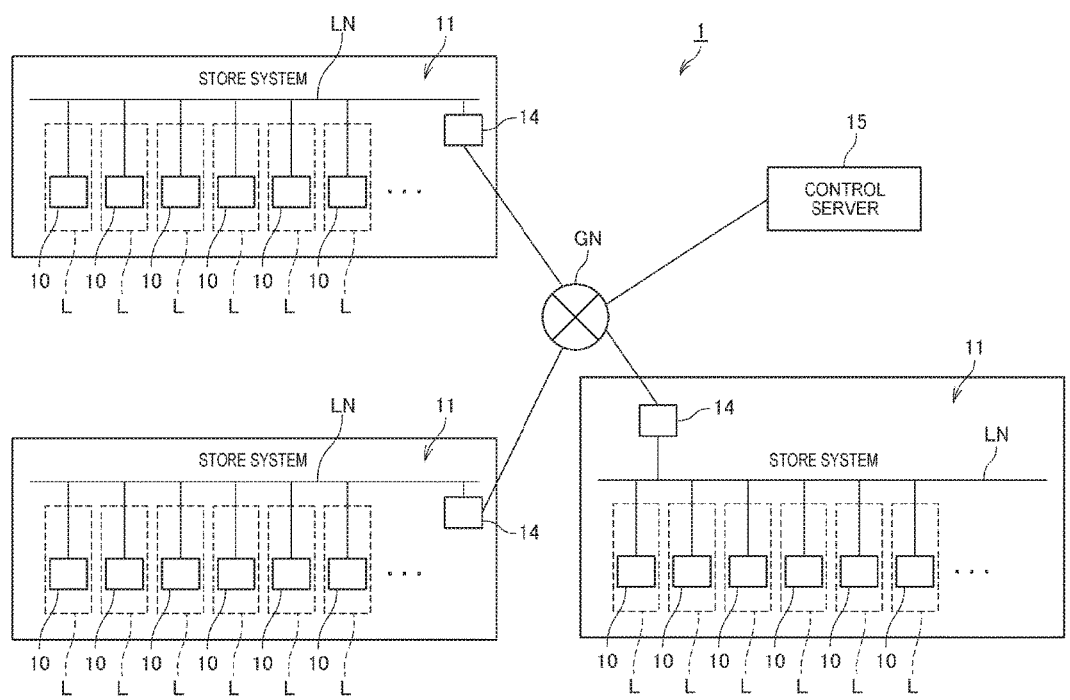
FIG. 1 illustrates the configuration of a network system related to a preferred embodiment of the disclosure.

FIG. 1 shows the configuration of a transaction processing system 1 (network system) according to a preferred embodiment of the disclosure.

As shown in FIG. 1, the transaction processing system 1 includes a plurality of store systems 11. A store system 11 is a system that is used in retail businesses such as supermarkets, convenience stores, department stores, and restaurants.

The store system 11 has functions for processing transactions according to the products purchased by customers, and producing sales (transaction) receipts based on the transactions.

A checkout counter L where customer transactions are processed is located in the business where the store system 11 is deployed. A POS terminal 10 (control device) that can produce receipts appropriate to the transaction is installed at each checkout counter L.

The POS terminal 10 has functions for executing a transaction process appropriate to the transaction performed at the checkout counter L, and producing receipts recorded with information related to the transaction. The receipt produced by the POS terminal 10 is then given to the customer.

The configuration and functions of the POS terminal 10, and processes based on the functions of the POS terminal 10, are described further below.

The store system 11 also has a local area network LN.

The POS terminal 10 connects to the local area network LN according to a communication protocol appropriate to the LAN. Any suitable communication protocol may be used by the POS terminal 10 to connect to the local area network LN, and a wired or wireless connection may be used.

A communication device 14 is also connected to the local area network LN. The communication device 14 is an interface device that connects the local area network LN to a global network GN (network) such as the Internet. The communication device 14 has the functions of a modem (or ONU (Optical Network Unit)), a router, a DHCP (Dynamic Host Configuration Protocol) server, and a NAT (Network Address Translation) unit. The communication device 14 passes data between devices when a device connected to the local area network LN and a device connected to the global network GN communicate with each other. Note that the communication device 14 is represented by a single function block in FIG. 1, but the communication device 14 may comprise plural devices with different functions.

The POS terminal 10 can also access the global network GN through the communication device 14.

A control server 15 (server) connects to the global network GN. The control server 15 has a server function, and is a cloud server in a cloud system in which the POS terminal 10 is a client. More specifically, when triggered by a request from a client device, for example, the control server 15 runs a specific operating process and sends data based on the result of the process to the client. Note that the control server 15 is represented by a single function block in FIG. 1, but this does not mean that the control server 15 is embodied by a single server device. For example, the control server 15 may include a plurality of server devices. More specifically, the control server 15 may be any configuration that can execute the processes described below.

Figure 2:
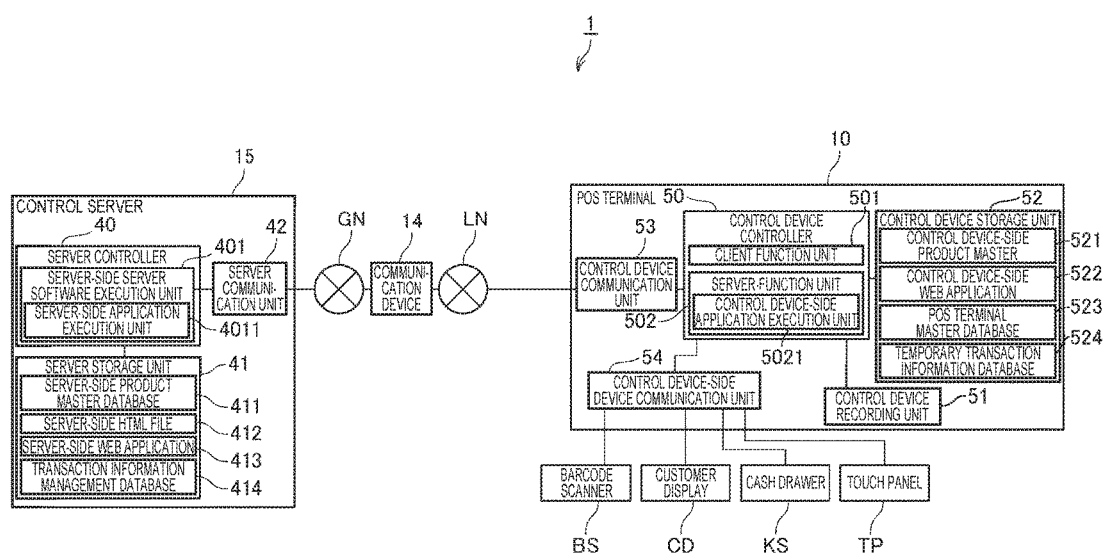
FIG. 2 is a block diagram illustrating the functional configuration of devices in the network system.

FIG. 2 is a block diagram illustrating the functional configuration of the POS terminal 10 and control server 15 in the transaction processing system 1.

The POS terminal 10 is a thermal line printer that stores roll paper (recording medium) and records images by forming dots with a thermal line head on the roll paper.

As shown in FIG. 2, the POS terminal 10 has a control device controller 50 (control unit), a control device recording unit 51, a control device storage unit 52, a control device communication unit 53 (communication unit), and a control device-side device communication unit 54.

The control device controller 50 has a CPU, ROM, RAM, and other peripheral circuits not shown, and controls the POS terminal 10.

The control device recording unit 51 includes mechanisms related to recording on roll paper, such as a conveyance mechanism for conveying roll paper stored inside the cabinet of the POS terminal 10, a recording mechanism for forming dots and recording images on the roll paper with a thermal head, and a cutter mechanism for cutting the roll paper at a specific position. The control device recording unit 51 conveys the roll paper with the conveyance mechanism, records receipt-related images on the roll paper with the recording mechanism, and cuts the roll paper at a specific position with the cutter mechanism as controlled by the control device controller 50 to produce a receipt.

The control device storage unit 52 has nonvolatile memory such as an EPROM device, and stores data.

The control device storage unit 52 stores a control device-side product master database 521 (control device-side data), which is a product master database relationally storing the product code of a product to other information related to that product. The information related to the product includes at least the price of the product.

The control device storage unit 52 also stores a control device-side web application 522. The control device-side web application 522 is described further below.

The control device storage unit 52 also stores a POS terminal master database 523. The POS terminal master database 523 is described further below.

A specific web browser is installed on the POS terminal 10. The control device controller 50 functions as a client-function unit 501 by reading and running the installed web browser.

Specific web server software is also installed on the POS terminal 10. The control device controller 50 also functions as a server-function unit 502 by reading and running the installed web server software.

The control device-side web application 522 is a software application that is run by the specific web server software application installed on the POS terminal 10, and communicates with the specific web server application by interprocess communication.

The server-function unit 502 also functions as a control device-side application execution unit 5021 by reading and running the control device-side web application 522.

The server-function unit 502 has a server function, and in relationship to the client-function unit 501 functions as a server of which the client function unit 501 is a client.

The functions of the function blocks of the control device controller 50, and processes based on those functions, are described further below.

The control device communication unit 53 accesses the local area network LN and communicates with devices (including other POS terminals 10) connected to the network as controlled by the control device controller 50.

The control device communication unit 53 also accesses the global network GN and communicates with devices connected to the network (including the control server 15) through the communication device 14 as controlled by the control device controller 50.

The control device-side device communication unit 54 has an interface board with a USB port, a port conforming to a non-USB serial communication standard, or ports conforming to other communication protocols. Devices can connect to each port. The control device-side device communication unit 54 communicates with devices connected to the POS terminal 10 through the corresponding port as controlled by the control device controller 50.

Note that the control device-side device communication unit 54 may also be configured with a wireless communication capability and communicate with devices wirelessly.

A barcode scanner BS, customer display CD, cash drawer KS, and touch panel TP are devices connected to the POS terminal 10.

The barcode scanner BS is used to read barcodes from products and product packaging, and outputs data representing the barcode to the control device-side device communication unit 54. The control device-side device communication unit 54 then outputs the data input from the barcode scanner BS to the control device controller 50.

The customer display CD displays images as controlled by the control device controller 50. The information presented on the customer display CD can be read by the customer involved in the transaction at the checkout counter L.

The cash drawer KS has a tray for storing cash, and a mechanism for locking the tray, and unlocks and opens the tray as controlled by the control device controller 50.

The touch panel TP has a display device such as an LCD panel or OLED panel, and a touch sensor disposed over the display device for detecting touch operations by the user (including the checkout clerk). The touch panel TP is disposed to a position at the checkout counter L where it can be read by the checkout clerk and operated by touch. The touch panel TP displays images on the display device as controlled by the control device controller 50. The client function unit 501 of the control device controller 50 can display a web page on the touch panel TP based on an HTML file acquired by a specific means. When a touch operation by the user is detected, the touch panel TP outputs a signal indicating the touched position to the control device controller 50.

Based on input from the touch panel TP, the control device controller 50 executes a process corresponding to the touch operation of the user.

As shown in FIG. 2, the control server 15 has a server controller 40, server storage unit 41, and server communication unit 42.

The server controller 40 includes a CPU, ROM, RAM, and other peripheral circuits, and controls the control server 15.

The server storage unit 41 has nonvolatile memory such as a hard disk drive or EEPROM device not shown, and stores data.

The server storage unit 41 stores a server-side product master database 411 (server-side data) relationally storing a product code for each product and the product price.

The server storage unit 41 stores a server-side HTML file 412, which is an HTML file. The server-side HTML file 412 is described further below.

The server storage unit 41 stores a server-side web application 413. The server-side web application 413 is described further below.

The server storage unit 41 also stores a transaction information management database 414. The transaction information management database 414 is described further below.

Specific web server software is installed on the control server 15. The server controller 40 functions as a server-side server software execution unit 401 by reading and running the installed web server software.

The server-side web application 413 is a software application that is run by the specific web server software installed on the control server 15, and communicates with the specific web server application by interprocess communication.

The server-side server software execution unit 401 also functions as a server-side application execution unit 4011 by reading and running the server-side web application 413.

The server communication unit 42 accesses the global network GN and communicates with devices connected to the network (including the POS terminal 10) as controlled by the server controller 40.

The client-function unit 501 is described in detail next.

The checkout clerk working the register at the checkout counter L (or other person) turns the POS terminal 10 installed at the same checkout counter L on at some specific time before the transaction starts. For example, the checkout clerk may turn the power of the POS terminal 10 on before the store where the transaction processing system 1 is installed opens each day.

The POS terminal 10 is configured to automatically start a specific web browser installed on the POS terminal 10 when the power turns on.

When the browser starts, the client function unit 501 of the POS terminal 10 accesses a specific URL on the control server 15, and accesses the control server 15 by HTTP. The URL of the control server 15 and other information required to communicate with the control server 15 is previously registered. When accessed by the POS terminal 10, the server-side server software execution unit 401 of the server controller 40 of the control server 15 sends the server-side HTML file 412 corresponding to the accessed URL to the POS terminal 10. The client function unit 501 of the control device controller 50 of the POS terminal 10 thus acquires the server-side HTML file 412 transmitted by the control server 15.

A program with a function for communicating with the server-side application execution unit 4011 of the server controller 40 of the control server 15 in specific circumstances as described below to execute transaction-related processes, and a function for communicating with the control device-side application execution unit 5021 of the server-function unit 502 in specific circumstances as described below to execute transaction-related processes, is embedded in the server-side HTML file 412 in a specific scripting language. The functions of the client function unit 501 of the control device controller 50 of the POS terminal 10 are embodied by programs written in a specific scripting language that runs on the browser, the server-side web application 413 of the control server 15, the control device-side web application 522 of the POS terminal 10, and associated programs.

As described above, the POS terminal 10 executes a transaction process according to a transaction performed at the checkout counter L, and creates a record based on the transaction process. The process of creating the record is described in detail below. Specifically, the client-function unit 501 changes the device with which it communicates between the control server 15 and the server-function unit 502 by means of a communication monitoring and switching process described below. When the communication device is set to the control server 15, the client-function unit 501 communicates with the control server 15, executes a transaction-related process with the control server 15, and creates a transaction record. When the communication device is set to the server-function unit 502, the client-function unit 501 communicates with the server-function unit 502, executes a transaction-related process with the server-function unit 502, and creates a transaction record.

The communication monitoring and switching process is described below, and the operation of the POS terminal 10 when communicating with the control server 15 and when communicating with the server-function unit 502 is then described.

Figure 3:
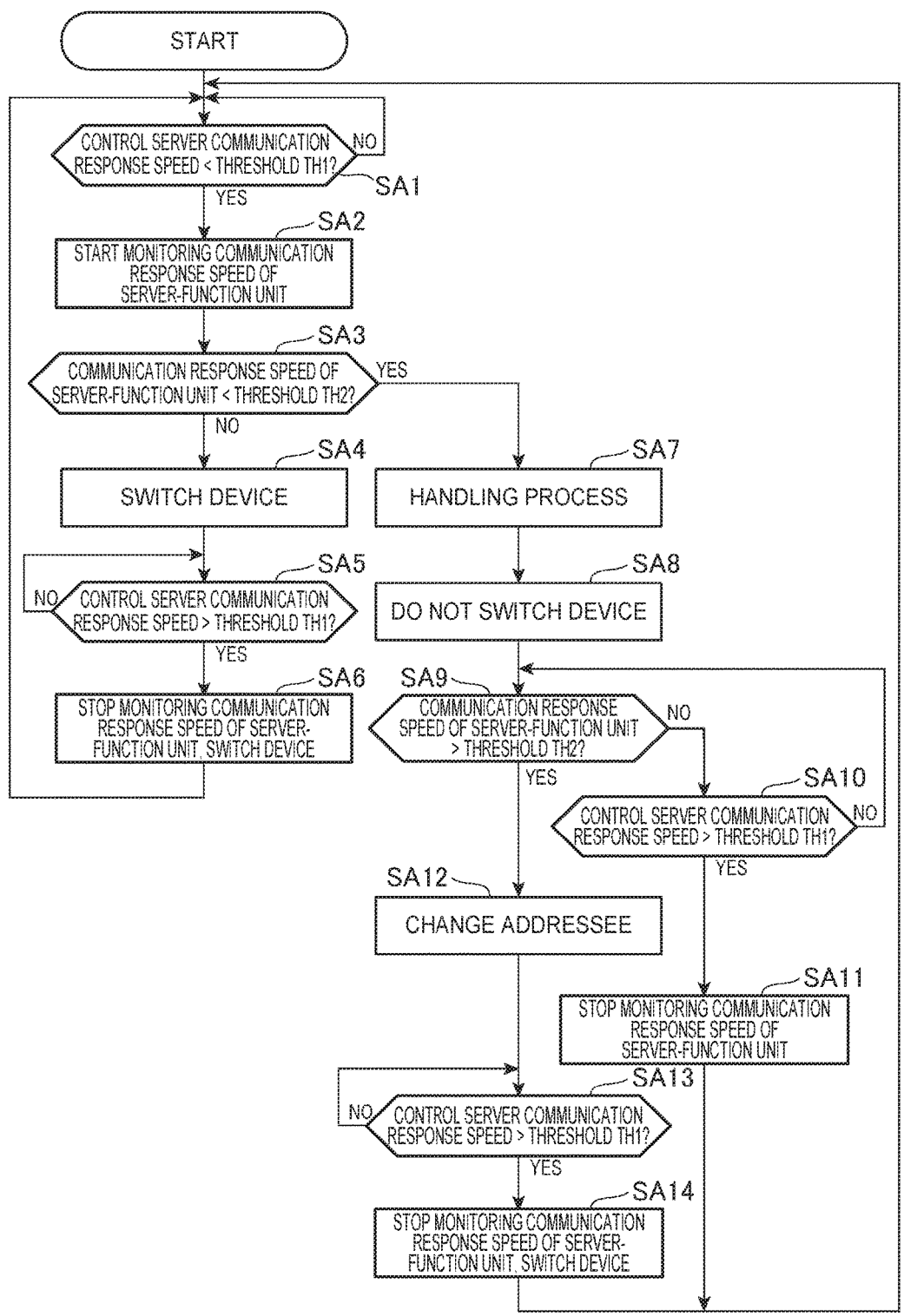
FIG. 3 is a flow chart of an operation of a POS terminal.

FIG. 3 is a flow chart showing the operation of the POS terminal 10 when executing the communication monitoring and switching process.

Note that when the operation shown in FIG. 3 starts, the client-function unit 501 is set to communicate with the control server 15.

After the browser of the POS terminal 10 starts and the server-side HTML file 412 is acquired, the client-function unit 501 executes the following process continuously.

More specifically, the client-function unit 501 sends data related to a response request to the control server 15 at a specific interval. The control server 15 has a function for returning response data when response request data is received. The client-function unit 501 then measures the communication response speed of the control server 15 based on how much time passes until the response data is received after the response request data is sent. As described above, the client-function unit 501 measures how long it takes to receive from the control server 15 a response to the response request data that is transmitted at a specific interval, and thereby monitors the communication response speed of the control server 15. Note that the method of measuring the communication response speed (the method of monitoring the communication response speed) is not limited to the foregoing example, and any appropriate method may be used.

As shown in FIG. 3, the client-function unit 501 monitors whether or not the communication response speed of the control server 15 is less than a specific threshold TH1 (a specific speed) (step SA1). The specific threshold TH1 value is set so that if communication between the POS terminal 10 and the control server 15 is delayed for more than an allowable time, the communication response speed of the control server 15 is below the threshold TH1. The specific threshold TH1 is set based on tests or simulations.

If the communication response speed of the control server 15 is less than the threshold TH1, the client-function unit 501 determines that normal communication with the control server 15 is not possible. More specifically, in this embodiment of the disclosure, a state in which the POS terminal 10 and control server 15 cannot communicate normally is when the communication response speed of the control server 15 is below the threshold TH1.

If in step SA1 the communication response speed of the control server 15 is below the threshold TH1 (step SA1: YES), the client-function unit 501 starts monitoring the communication response speed of the server-function unit 502 (step SA2).

In this event, when monitoring the communication response speed of the server-function unit 502, the client-function unit 501 outputs response request data to the server-function unit 502 at a specific interval. The server-function unit 502 has a function for returning response data when response request data is received. The client-function unit 501 then measures the communication response speed of the server-function unit 502 based on how much time passes until the response data is received after the response request data is output. As described above, the client-function unit 501 measures how long it takes to receive from the server-function unit 502 a response to the response request data transmitted at a specific interval, and thereby monitors the communication response speed of the server-function unit 502. Note that the method of measuring the communication response speed (the method of monitoring the communication response speed) is not limited to the foregoing example, and any appropriate method may be used.

In this embodiment of the disclosure, if the communication response speed of the control server 15 is greater than the threshold TH1, the client-function unit 501 does not monitor the communication response speed of the server-function unit 502, but if the communication response speed of the control server 15 is less than the threshold TH1, starts monitoring the communication response speed of the server-function unit 502. If the communication response speed of the control server 15 is greater than the threshold TH1, the addressed device is not changed and remains set to the control server 15, and there is no need to monitor the communication response speed of the server-function unit 502. By thus starting monitoring the communication response speed of the server-function unit 502 after the communication response speed of the control server 15 goes below the threshold TH1, unnecessarily monitoring the communication response speed of the server-function unit 502 can be prevented, the processor load on the POS terminal 10 can be reduced, and processing efficiency can be improved.

After starting monitoring the communication response speed of the server-function unit 502, the client-function unit 501 determines if the communication response speed of the server-function unit 502 is less than a threshold TH2 (step SA3). The specific threshold TH2 value is set so that if communication between the client-function unit 501 and server-function unit 502 is delayed for more than an allowable time, the communication response speed of the server-function unit 502 is below the threshold TH2. The specific threshold TH2 is set based on tests or simulations.

If the communication delay exceeds the allowable range of the communication response speed of the server-function unit 502 (if the communication response speed of the server-function unit 502 is slower than the threshold TH2), the CPU of the POS terminal 10 may be overloaded, or the server-function unit 502 may be running multiple processes. However, because the specifications of the CPU of the POS terminal 10 anticipate changing the device the client-function unit 501 communicates with to the server-function unit 502 when normal communication with the control server 15 is not possible, the possibility of a drop in the communication response speed of the server-function unit 502 is extremely low compared with the possibility of a delay in communication with the control server 15. In other words, the possibility of a delay in communication with the control server 15 and communication with the control device controller 50 both exceeding the allowable range is extremely low.

If in step SA3 the communication response speed of the server-function unit 502 is not lower than the threshold TH2 (step SA3: NO), the client-function unit 501 changes the addressed device from the control server 15 to the server-function unit 502 (step SA4).

Next, the client-function unit 501 monitors if the communication response speed of the control server 15 has become faster than the threshold TH1 (step SA5). Note that the threshold used for comparison with the communication response speed of the control server 15 in step SA5 is not limited to threshold TH1, and may be a threshold reflecting the threshold TH1 with a specific margin.

If the communication response speed of the control server 15 is greater than the threshold TH1 (step SA5: YES), the client-function unit 501 stops monitoring the communication response speed of the server-function unit 502, changes the device addressed by the client-function unit 501 to the control server 15 (step SA6), and then returns to step SA1.

If in step SA3 the communication response speed of the server-function unit 502 is determined to be slower than threshold TH2 (step SA3: YES), the client-function unit 501 executes a corresponding process (step SA7) and the addressed device does not change (step SA8). In step SA7, the client-function unit 501 displays information on the touch panel TP indicating that the transaction process and associated processes cannot be executed because normal communication with the control server 15 and server-function unit 502 is not possible. By reading the information on the touch panel TP in this event, the user, such as the checkout clerk, can know that a transaction cannot be processed with the POS terminal 10 and why, and based thereon can take action to resolve the problem.

As described above, the client-function unit 501 does not change the addressed device when the communication response speed of the server-function unit 502 is slower than threshold TH2 even if the communication response speed of the control server 15 is slower than threshold TH1. As a result, the device addressed as the server is not changed unnecessarily.

Next, the client-function unit 501 monitors whether or not the communication response speed of the server-function unit 502 is faster than threshold TH2 (or a threshold reflecting threshold TH2 with a margin) (step SA9), and if the communication response speed of the server-function unit 502 is slower than threshold TH2 (step SA9: NO), monitors if the communication response speed of the control server 15 has become faster than threshold TH1 (or a threshold reflecting threshold TH1 with a margin) (step SA10).

If the communication response speed of the control server 15 is faster than threshold TH1 (step SA10: YES), the client-function unit 501 stops monitoring the communication response speed of the server-function unit 502 (step SA11), and returns to step SA1.

If the communication response speed of the server-function unit 502 becomes faster than threshold TH2 before the communication response speed of the control server 15 becomes faster than threshold TH1 (step SA9: YES), the client-function unit 501 switches communication from the control server 15 to the server-function unit 502 (step SA12).

Next, the client-function unit 501 monitors whether or not the communication response speed of the control server 15 has become faster than the threshold TH1 (or a threshold reflecting threshold TH1 with a margin) (step SA13).

If the communication response speed of the control server 15 is faster than threshold TH1 (step SA13: YES), the client-function unit 501 stops monitoring the communication response speed of the server-function unit 502 and switches communication from the client-function unit 501 to the control server 15 (step SA14), and returns to step SA1.

As described below, when communication is switched to the server-function unit 502, the client-function unit 501 communicates with the control device-side application execution unit 5021 of the server-function unit 502 instead of the server-side application execution unit 4011 of the control server 15, and executes the transaction process and associated processes in conjunction with the control device-side application execution unit 5021. The server-side web application 413 embodying the function of the server-side application execution unit 4011, and the control device-side web application 522 embodying the function of the control device-side application execution unit 5021, are applications with identical functionality, and are synchronized by a specific means. In addition, the server-side product master database 411 used when the server-side application execution unit 4011 executes processes, and the control device-side product master database 521 used when the control device-side application execution unit 5021 of the server-function unit 502 executes processes, contain the same content, and are synchronized by a specific means described below. As a result, the process result of one process the client-function unit 501 executes with the server-side application execution unit 4011, and the result of the same process the client-function unit 501 executes with the control device-side application execution unit 5021, are fundamentally the same, and changing the device the client-function unit 501 communicates with does not change the result of the process.

As described above, the client-function unit 501 monitors the communication response speed of the control server 15, determines normal communication with the control server 15 is not possible if the communication response speed is slower than a specific speed, and except in specific circumstances switches communication from the control server 15 to the server-function unit 502.

As a result, the client-function unit 501 switches communication to the server-function unit 502 and can continue running processes (including a transaction process) even when normal communication with the control server 15 is not possible. Business operations are therefore not interrupted. It is also possible to connect a server (substitute server) that can replace the control server 15 to the local area network LN, and the client-function unit 501 could be configured to access the substitute server through the local area network LN when normal communication with the control server 15 is not possible. In this case, however, normal communication with the substitute server may also not be possible due to congestion on the local area network LN or other reason. On the other hand, because the device with which the client-function unit 501 communicates is changed to the server-function unit 502, with which the client-function unit 501 can communicate by interprocess communication and which is part of the same device as the client-function unit 501, instead of to a substitute server connected through a network, these communication problems will not occur, and the possibility of being able to continue normal business operations even when normal communication with the control server 15 is not possible is extremely high.

Note that when normal communication with the control server 15 is possible, the client-function unit 501 in this embodiment of the disclosure communicates with the control server 15. More specifically, communication between the client-function unit 501 and control server 15 is prioritized over communication with the server-function unit 502. This is for the following reason. Specifically, each POS terminal 10 in the transaction processing system 1 must execute processes using data, such as the server-side product master database 411, stored on the control server 15 by functions of the server-side web application 413. This is because identical processes can still be executed when the content of the server-side product master database 411 changes, or when the server-side web application 413 changes, because each POS terminal 10 uses master databases reflecting the most recent content and functions of the program reflecting the most recent changes. As a result, the client-function unit 501 prioritizes communication with the control server 15 over communication with the server-function unit 502.

Transaction Processing when the POS Terminal 10 and Control Server 15 Communicate Normally The operation of devices in the transaction processing system 1 when a transaction is performed at the checkout counter L and the POS terminal 10 can communicate normally with the control server 15 is described next.

Figure 5:
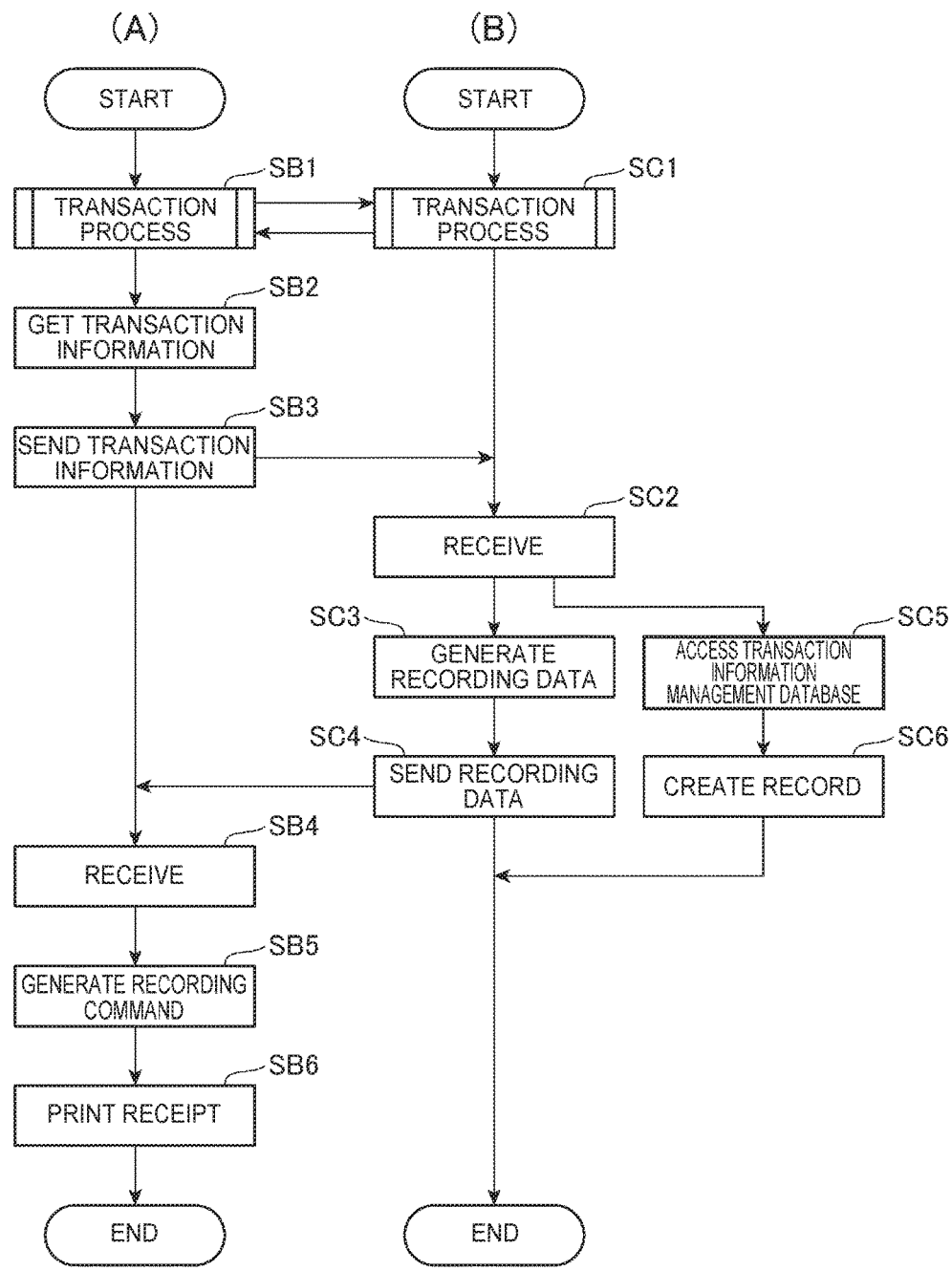
FIG. 5 is a flow chart of an operation of a POS terminal and control server.

In the communication monitoring and switching process described above, the client-function unit 501 determines if normal communication with the control server 15 is possible, and if normal communication is possible, sets the addressed device to the control server 15 and executes the process of the flow chart shown in column (A) of FIG. 5.

The checkout clerk working the register at the checkout counter L (or other person) turns the POS terminal 10 installed at the same checkout counter L on at some specific time before the transaction starts. For example, the checkout clerk may turn the power of the POS terminal 10 on before the store where the transaction processing system 1 is installed opens each day.

When the browser starts, the client function unit 501 of the POS terminal 10 acquires the server-side HTML file 412 from the control server 15. The client-function unit 501 executes the acquired server-side HTML file 412, and displays a user interface for processing transactions 60 (FIG. 4) on the touch panel TP.

Figure 4:
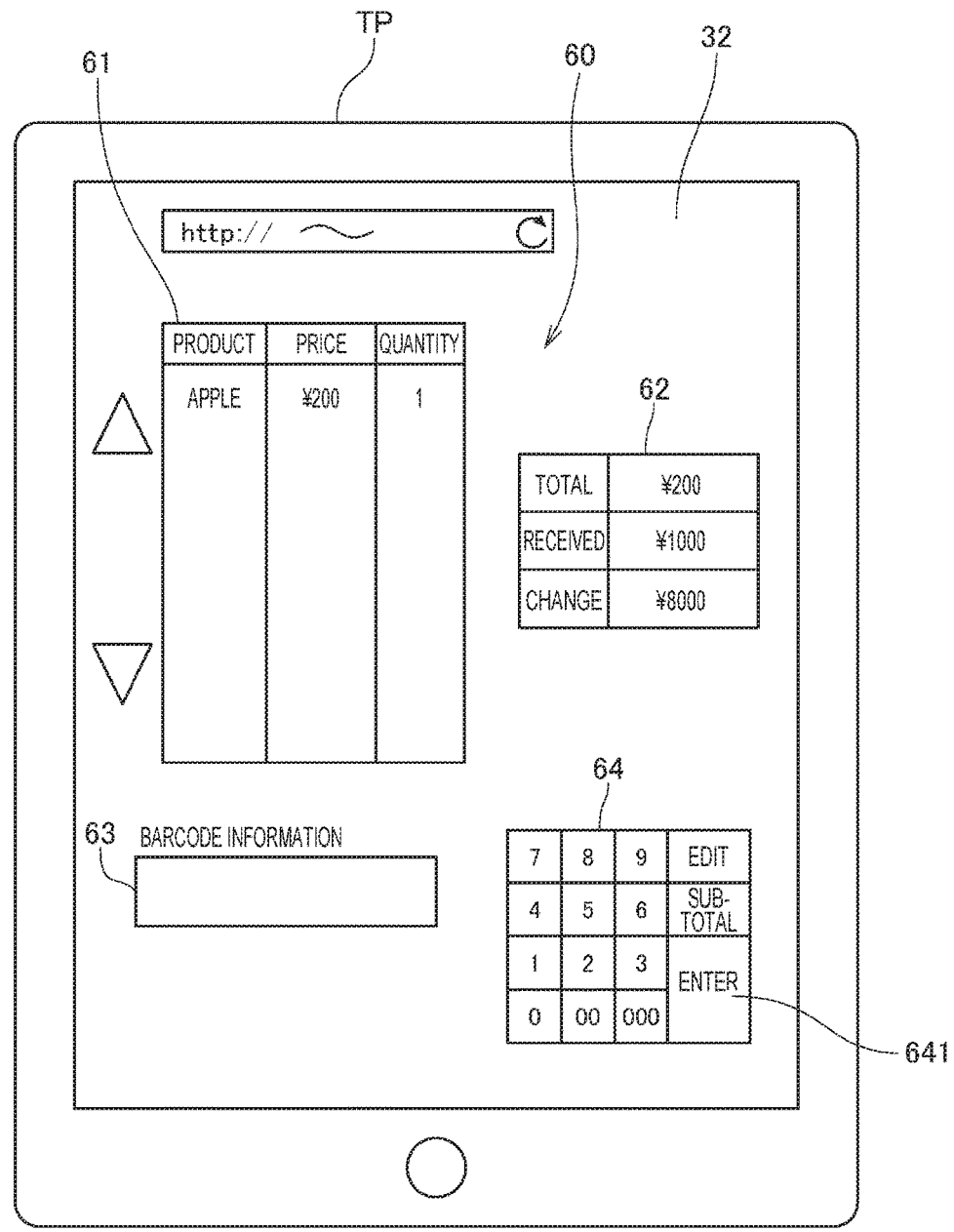
FIG. 4 shows an example of a user interface for authentication.

FIG. 4 shows an example of a user interface for processing transactions 60 that is displayed on the touch panel TP.

A list display area 61 where the names of the products (product names) being purchased by the customer, the prices of the products, and the quantities of the products are presented in a list is displayed at the top left of the user interface for processing transactions 60 shown in FIG. 4. To the right of this list display area 61 is presented an amount display area 62 where the total amount of the products being purchased by the customer, the amount of money received from the customer in the transaction, and the amount of change due to the customer are displayed.

Below the list display area 61 is a barcode information display area 63 the information (referred to below as barcode information) expressed by the barcode that is read by the barcode scanner BS is displayed. The barcode information is the product code assigned to the product, for example.

A virtual keypad 64 is displayed on the right side of the barcode information display area 63. The virtual keypad 64 includes an Enter key 641 for finalizing the transaction.

FIG. 5 is a flow chart showing the operation of devices in the transaction processing system 1 during a transaction. Column (A) shows the operation of the POS terminal 10, and column (B) shows the operation of the control server 15.

As shown in column (A) of FIG. 5 and column (B) of FIG. 5, the POS terminal 10 and control server 15 start the transaction process when a transaction begins (step SB1 and step SC1).

Figure 6:
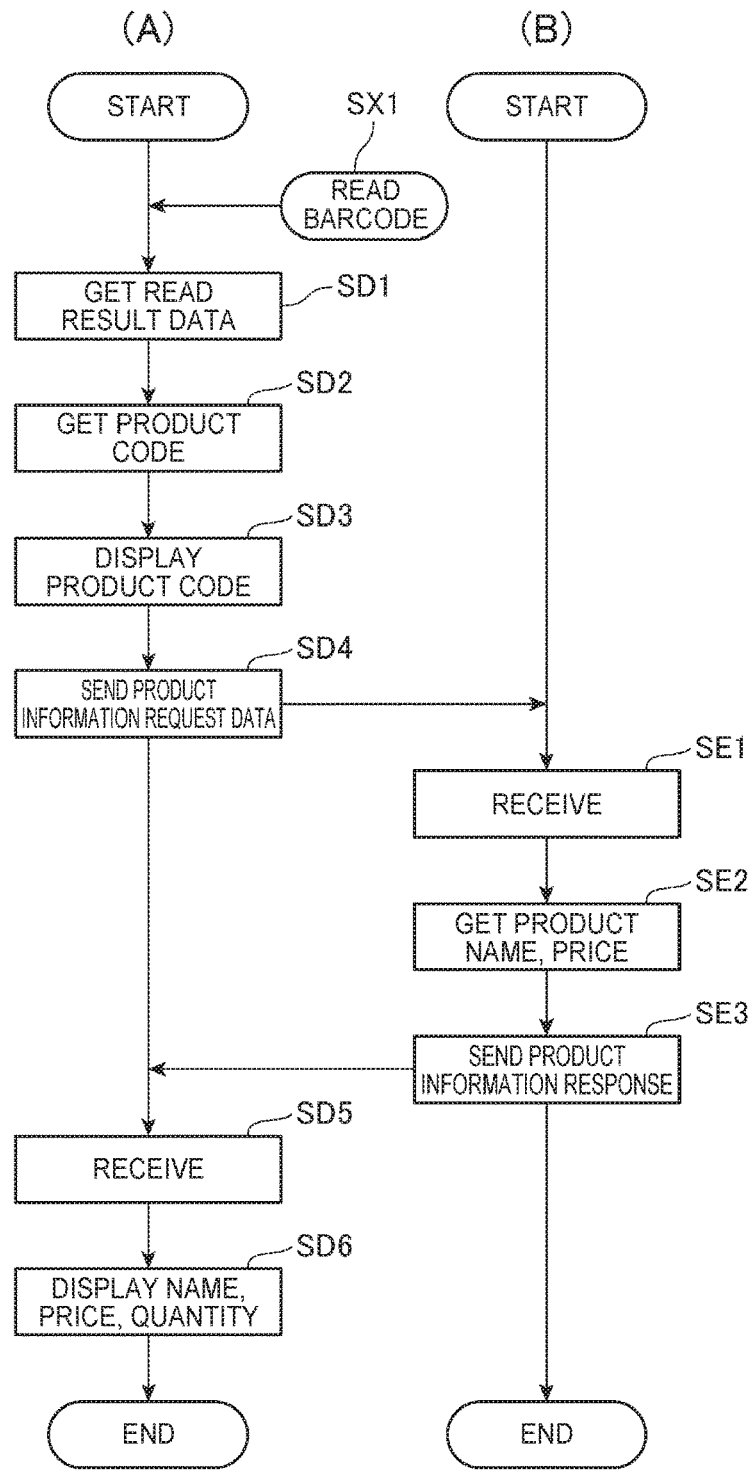
FIG. 6 is a flow chart of an operation of a POS terminal and control server.

FIG. 6 is a flow chart showing part of the process executed by the POS terminal 10 and control server 15 in the transaction process. Column (A) shows the operation of the POS terminal 10, and column (B) shows the operation of the control server 15.

In the transaction process, the checkout clerk reads the barcode on the product or the packaging of the product being purchased by the customer with the barcode scanner BS (step SX1). Upon reading a barcode, the barcode scanner BS sends data based on the read result (referred to below as as the "read result data") through the port to which the barcode scanner BS is connected to the control device-side device communication unit 54 of the POS terminal 10. The control device-side device communication unit 54 then outputs the read result data to the control device controller 50.

The read result data is data including information indicating the product code of the product.

As shown in column (A) of FIG. 6, the client function unit 501 of the control device controller 50 of the POS terminal 10 acquires the read result data based on the input from the control device-side device communication unit 54 (step SD1).

Next, the client function unit 501 acquires the product code based on the read result data (step SD2).

Next, the client function unit 501 displays the product code acquired in step SD2 in the barcode information display area 63 of the user interface for processing transactions 60 (step SD3).

Next, the client function unit 501 controls the control device communication unit 53 to send the product name for the product code acquired in step SD2 and data querying the price of the product (referred to below as as product information request data) to the control server 15 (step SD4).

Note that the client function unit 501 manages the information required to communicate with the control server 15, such as the address of the control server 15 and the corresponding protocol, opens a connection with the control server 15 based on the managed information, and communicates data through the opened connection.

As shown in column (B) of FIG. 6, the server-side application execution unit 4011 of the server controller 40 of the control server 15 controls the server communication unit 42 to receive the product information request data (step SE1).

Next, based on the received product information request data, the server-side application execution unit 4011 acquires the product code, references the server-side product master database 411 stored by the server storage unit 41, and acquires the name and the price of the product identified by the acquired product code (step SE2).

Next, the server-side application execution unit 4011 controls the server communication unit 42, and sends product information response data expressing the product name and price information acquired in step SE2 to the POS terminal 10 (step SE3).

As shown in column (A) of FIG. 6, the client function unit 501 of the control device controller 50 of the POS terminal 10 controls the control device communication unit 53 to receive the product information response data (step SD5).

Next, the client function unit 501 acquires the product name and product price based on the received product information response data, and displays the name, price, and quantity of the product in the corresponding fields of the list display area 61 in the user interface for processing transactions 60 (step SD6).

As described above, during a transaction, the checkout clerk reads the barcode with the barcode scanner BS from each product being purchased by the customer, and the POS terminal 10 and control server 15 execute the process shown in the flow chart in FIG. 6 based on the read barcode.

When reading the barcode from every product and processing by each device based on the read barcode is completed, the name, price, and quantity of each product being purchased by the customer is displayed in the list display area 61.

When the barcode of every product has been read, the checkout clerk uses the virtual keypad 64 to confirm the transaction total, receives payment from the customer, and makes change as due. The client function unit 501 of the control device controller 50 of the POS terminal 10 then appropriately displays the total of the products purchased by the customer, the amount received from the customer for the transaction, and the change due to the customer in the amount display area 62 of the user interface for processing transactions 60. The client function unit 501 also controls the customer display CD appropriately to display information related to the transaction on the customer display CD. The client function unit 501 also controls the cash drawer KS appropriately to open the tray of the cash drawer KS.

When change has been given to the customer, the checkout clerk presses the Enter key 641 of the virtual keypad 64 of the user interface for processing transactions 60. The transaction process ends when the checkout clerk operates the Enter key 641.

As shown in column (A) of FIG. 5, when the transaction process ends, the client function unit 501 of the control device controller 50 of the POS terminal 10 acquires the transaction information (step SB2).

The transaction information is information including: identification information uniquely assigned to each transaction (referred to below as transaction identification information); information denoting the combination of product code, name, price, and quantity for each product purchased by the customer (referred to below as the purchased product information); information denoting the total purchase amount, cash amount received from the customer, and change returned to the customer (referred to below as transaction amount information); information denoting the time of the transaction (referred to below as as the transaction time information); and the store ID, which is identification information for the store (business) where the transaction was completed.

Note that during a transaction, the client function unit 501 stores information contained the purchased product information and information contained in the transaction amount information to specific storage areas. In step SC2, the client function unit 501 acquires purchased product information and transaction amount information based on the information stored to the specific storage areas.

The time that the transaction was performed as indicated by the transaction time information is the time when the Enter key 641 was operated. The time that the transaction was performed as indicated by the transaction time information is not limited to the time that the Enter key 641 was operated, and may be any time derived from the transaction, such as the time when the barcode for the first product was read in the transaction.

The client function unit 501 also has a function for generating transaction identification information for each transaction, and generates the transaction identification information using this function. The value of the transaction identification information is unique to each transaction performed in each store.

After acquiring the transaction information, the client function unit 501 controls the control device communication unit 53 to send transaction information data expressing the acquired transaction information to the control server 15 (step SB3).

As shown in column (B) of FIG. 5, the server-side application execution unit 4011 of the server controller 40 of the control server 15 controls the server communication unit 42 to receive the transaction information data (step SC2).

Next, the server-side application execution unit 4011 generates recording data for producing a receipt in a specific layout based on the transaction information indicated by the received transaction information data (step SC3).

The recording data is control data specifying producing a receipt according to a specific layout, and including in this example a top logo, bottom logo, transaction identification information, the time of the transaction, the name, price, quantity and total amount of the products purchased by the customer, the amount received from the customer, and the amount of change due to the customer. The recording data in this embodiment is an XML document of information written in a specific XML format.

Next, the server-side application execution unit 4011 controls the server communication unit 42 to send the generated recording data to the POS terminal 10 (step SC4).

As shown in column (A) of FIG. 5, the client function unit 501 of the control device controller 50 of the POS terminal 10 controls the control device communication unit 53 to receive the recording data (step SB4).

Next, the client function unit 501, based on the recording data in the XML document, generates recording commands in the command language of the control device recording unit 51 (step SB5).

Next, the client function unit 501, based on the generated recording commands, controls the control device recording unit 51 to produce a receipt (step SB6).

The receipt produced in step SB6 is then given by the checkout clerk to the customer.

As shown in column (B) of FIG. 5, after the transaction information data is received in step SC2, the server-side application execution unit 4011 of the server controller 40 of the control server 15 accesses the transaction information management database 414 stored by the server storage unit 41 (step SC5).

Each record in the transaction information management database 414 relationally stores the purchased product information, transaction amount information, transaction time information, and store ID.

Next, based on the transaction information data received in step SC2, a record relating the transaction identification information, purchased product information, transaction amount information, transaction time information, and store ID is created in the transaction information management database 414 (step SC6).

The control server 15 thus cumulatively stores transaction information appropriate to the transaction. As a result, the control server 15 can manage sales by store and sales by individual product in each store.

Transaction Processing when the POS Terminal 10 and Control Server 15 Cannot Communicate Normally The operation of the POS terminal 10 when a transaction is performed at the checkout counter L and the POS terminal 10 cannot communicate normally with the control server 15 is described next.

Figure 7:
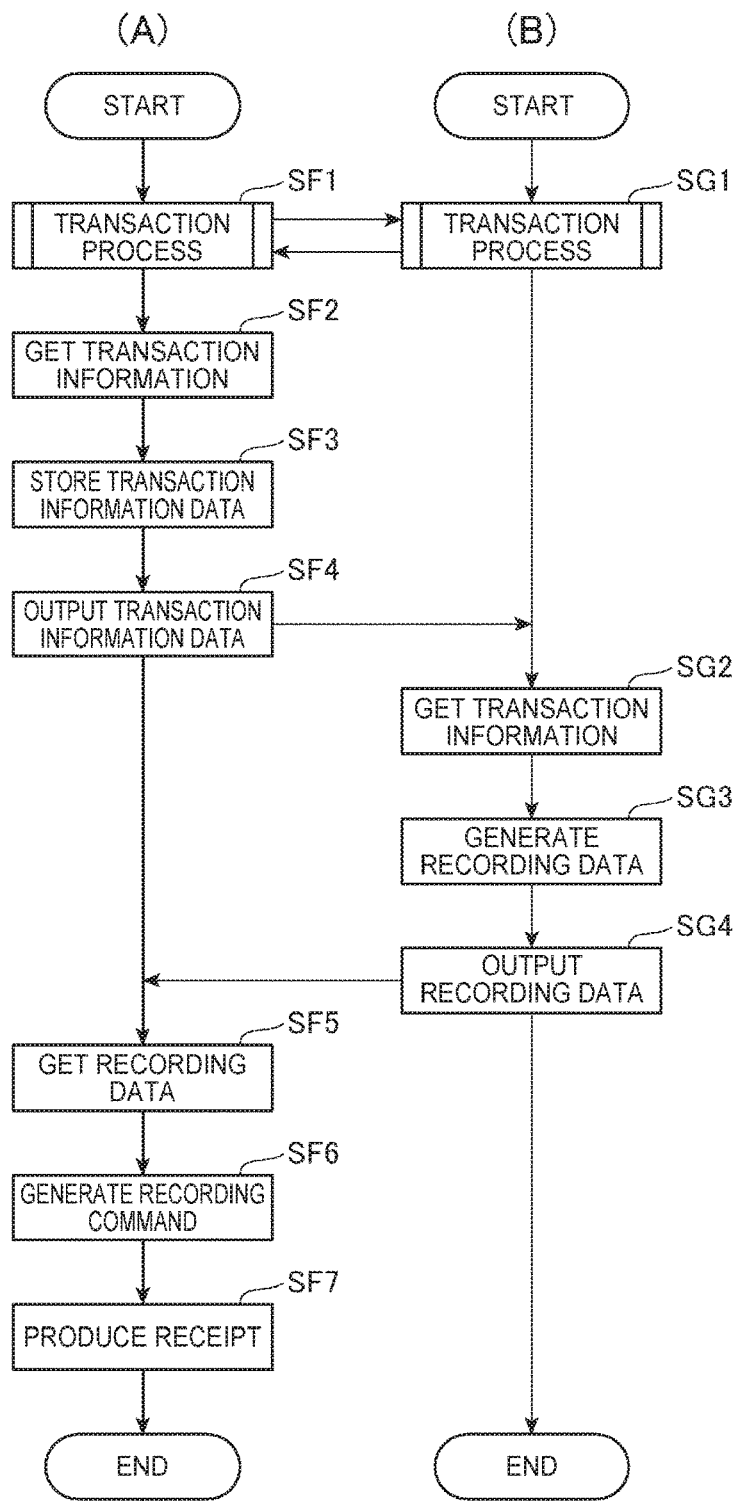
FIG. 7 is a flow chart of an operation of a POS terminal.

The client-function unit 501 determines if normal communication with the control server 15 is possible in the communication monitoring and switching process described above, and if normal communication is not possible, sets the addressed device to the server-function unit 502 and executes the process of the flow chart shown in column (A) of FIG. 7.

FIG. 7 is a flow chart showing the operation of the POS terminal 10 when communication with the control server 15 is not possible, column (A) showing the operation of the client function unit 501, and column (B) showing the operation of the server-function unit 502 (including the control device-side application execution unit 5021).

When the process shown in the flow chart in FIG. 7 starts, acquisition of the server-side HTML file 412 by the client function unit 501 of the POS terminal 10 has completed. More specifically, the process of the flow chart shown in FIG. 7 is based on the POS terminal 10 and control server 15 being not able to communicate normally with each other for some reason after the client function unit 501 has acquired the server-side HTML file 412.

Note that a configuration that stores a HTML file synchronized by some means with the server-side HTML file 412 in the POS terminal 10, and retrieves the stored HTML file when the client function unit 501 cannot acquire the server-side HTML file 412 from the control server 15 because the client function unit 501 cannot communicate normally with the control server 15 is also conceivable.

As shown in column (A) of FIG. 7 and column (B) of FIG. 7, the client function unit 501, and the control device-side application execution unit 5021 of the server-function unit 502, start the transaction process when a transaction begins (step SF1 and step SG1).

Figure 8:
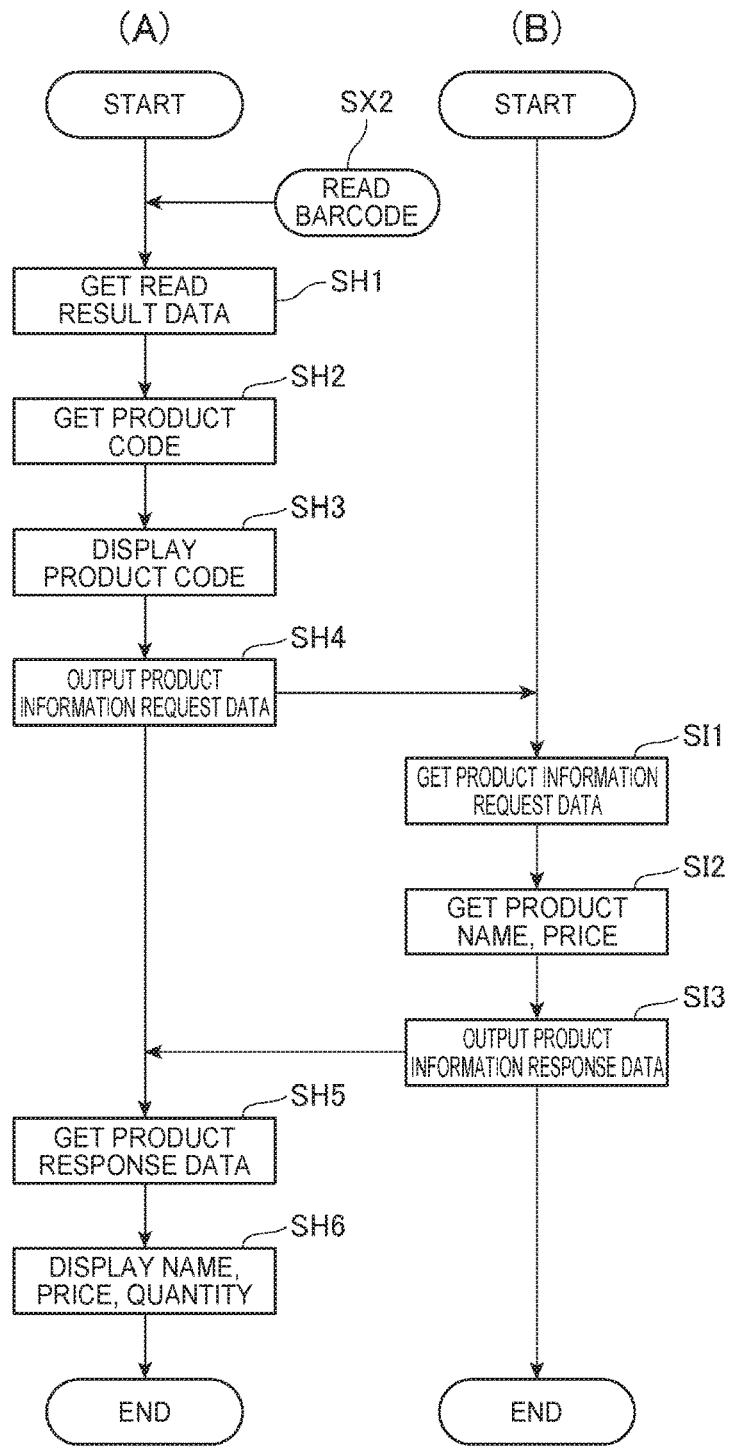
FIG. 8 is a flow chart of an operation of a POS terminal.

FIG. 8 is a flow chart showing part of the process executed by the client function unit 501 and the control device-side application execution unit 5021 in the transaction process, column (A) showing the operation of the client function unit 501, and column (B) showing the operation of the control device-side application execution unit 5021 of the server-function unit 502.

When the transaction process starts, the checkout clerk reads the barcode from the product or the packaging of the product being purchased by the customer with the barcode scanner BS (step SX2). When a barcode is read, the barcode scanner BS outputs the read result data through the port to which the barcode scanner BS is connected to the control device-side device communication unit 54 of the POS terminal 10. The control device-side device communication unit 54 then outputs the read result data to the control device controller 50. As described above, the read result data is data containing information indicating the product code of the product.

As shown in column (A) of FIG. 8, the client function unit 501 of the control device controller 50 of the POS terminal 10 acquires the read result data based on the input from the control device-side device communication unit 54 (step SH1).

Next, the client function unit 501 acquires the product code based on the read result data (step SH2).

Next, the client function unit 501 displays the product code acquired in step SH2 in the barcode information display area 63 of the user interface for processing transactions 60 (step SH3).

Next, the client function unit 501 controls the control device communication unit 53 to output product information request data querying the name and the price of the product identified by the product code acquired in step SH2 to the control device-side application execution unit 5021 (step SH4).

As shown in column (B) of FIG. 8, the control device-side application execution unit 5021 acquires the product information request data input from the client function unit 501 (step SI1).

Next, the control device-side application execution unit 5021 acquires the product code based on the acquired product information request data, references the control device-side product master 521 stored by the control device storage unit 52, and acquires the name and price of the product identified by the acquired product code (step SI2).

When the POS terminal 10 and control server 15 can communicate normally, the control device-side product master database 521 is synchronized by a specific means with the server-side product master database 411 stored on the control server 15. The control device-side product master database 521 and server-side product master database 411 may be synchronized as described below.

A specialized application with a function for synchronizing the control device-side product master database 521 with the server-side product master database 411 is installed on the POS terminal 10. By reading and running this application, the control device controller 50 communicates with the control server 15 at a specific time, such as when the POS terminal 10 power turns on, receives from the control server 15 a copy of the server-side product master database 411, and stores the received copy as the control device-side product master database 521 in the control device storage unit 52. The control device controller 50 then intermittently queries the control server 15 for any changes made to the server-side product master database 411.

If the server-side product master database 411 has not been updated between one query and the next, the server-side application execution unit 4011 of the control server 15 reports the same to the POS terminal 10 in response to the query. If the server-side product master database 411 has been updated between one query and the next, the server-side application execution unit 4011 sends to the POS terminal 10 a command to update the control device-side product master 521 appropriately to the changes to the server-side product master database 411. If such a control command is received from the control server 15 in response to the query, the control device controller 50 of the POS terminal 10 updates the control device-side product master 521 based on the control command.

Note that the means of synchronizing the control device-side product master 521 and the server-side product master database 411 is not limited to the foregoing. For example, instead of sending such a control command, the control server 15 may send a copy of the server-side product master database 411, or data describing the difference between the previous and current versions of the server-side product master database 411.

Further alternatively, instead of the POS terminal 10 querying the control server 15 for changes to the master database, the control server 15 may be configured to send the foregoing control command, send a copy of the server-side product master database 411, or send data describing the difference between the previous and current versions of the server-side product master database 411, to the POS terminal 10 whenever the server-side product master database 411 is updated.

Note that the server-side web application 413 and the control device-side web application 522 are also synchronized by the same method when the POS terminal 10 and control server 15 can communicate normally.

Next, the control device-side application execution unit 5021 outputs the product information response data denoting the product name and product price information acquired in step SI2 to the client function unit 501 (step SI3).

As shown in column (A) of FIG. 8, the client function unit 501 acquires the product information response data input from the control device-side application execution unit 5021 (step SH5).

Next, the client function unit 501 acquires the product name and price data based on the received product information response data, and displays the combination of name, price, and quantity information for the product in the appropriate fields of the list display area 61 in the user interface for processing transactions 60 (step SH6).

As shown in column (A) of FIG. 7, the client function unit 501 acquires the foregoing transaction information when the transaction process ends (step SF2).

Next, the client function unit 501 stores (records) the transaction information data representing the transaction information acquired in step SF2 in the temporary transaction information database 524 of the control device storage unit 52 (step SF3).

The temporary transaction information database 524 is a database that cumulatively temporarily stores transaction information data based on the transaction process executed by the POS terminal 10 when the control server 15 and POS terminal 10 cannot communicate with each other.

As described further below, after the client function unit 501 can communicate again with the control server 15, it sends the transaction information data cumulatively stored in the temporary transaction information database 524 to the control server 15. After sending the transaction information data to the control server 15, the client function unit 501 deletes the transmitted transaction information data from the temporary transaction information database 524.

After storing the transaction information in step SF3, the client function unit 501 outputs the transaction information data to the control device-side application execution unit 5021 (step SF4).

As shown in column (B) of FIG. 7, the control device-side application execution unit 5021 then acquires the transaction information data input from the client function unit 501 (step SG2).

Next, the control device-side application execution unit 5021 generates recording data for producing a receipt based on the transaction information described by the transaction information data acquired in step SG2 (step SG3). This recording data is an XML document of information written in a specific XML format.

Next, the control device-side application execution unit 5021 outputs the generated recording data to the client function unit 501 (step SG4).

As shown in column (A) of FIG. 7, the client function unit 501 acquires the recording data input from the control device-side application execution unit 5021 (step SF5).

Next, the client function unit 501 generates recording commands in a command language appropriate to the control device recording unit 51 based on the recording device data in the XML document (step SF6).

Next, the client function unit 501 controls the control device recording unit 51 to produce a receipt based on the generated recording commands (step SF7).

The receipt produced in step SF7 is then given by the checkout clerk to the customer.

As described above, when the POS terminal 10 cannot communicate normally with the control server 15, the POS terminal 10 processes transactions using the locally stored control device-side product master 521 instead of using the server-side product master database 411 on the control server 15. As a result, the POS terminal 10 can run the transaction process even when the POS terminal 10 and control server 15 cannot communicate with each other, and the user can continue normal business operations.

Operation of the POS terminal 10 and control server 15 after communication is re-enabled from a state in which the POS terminal 10 and control server 15 cannot communicate normally with each other is described next.

Figure 9:
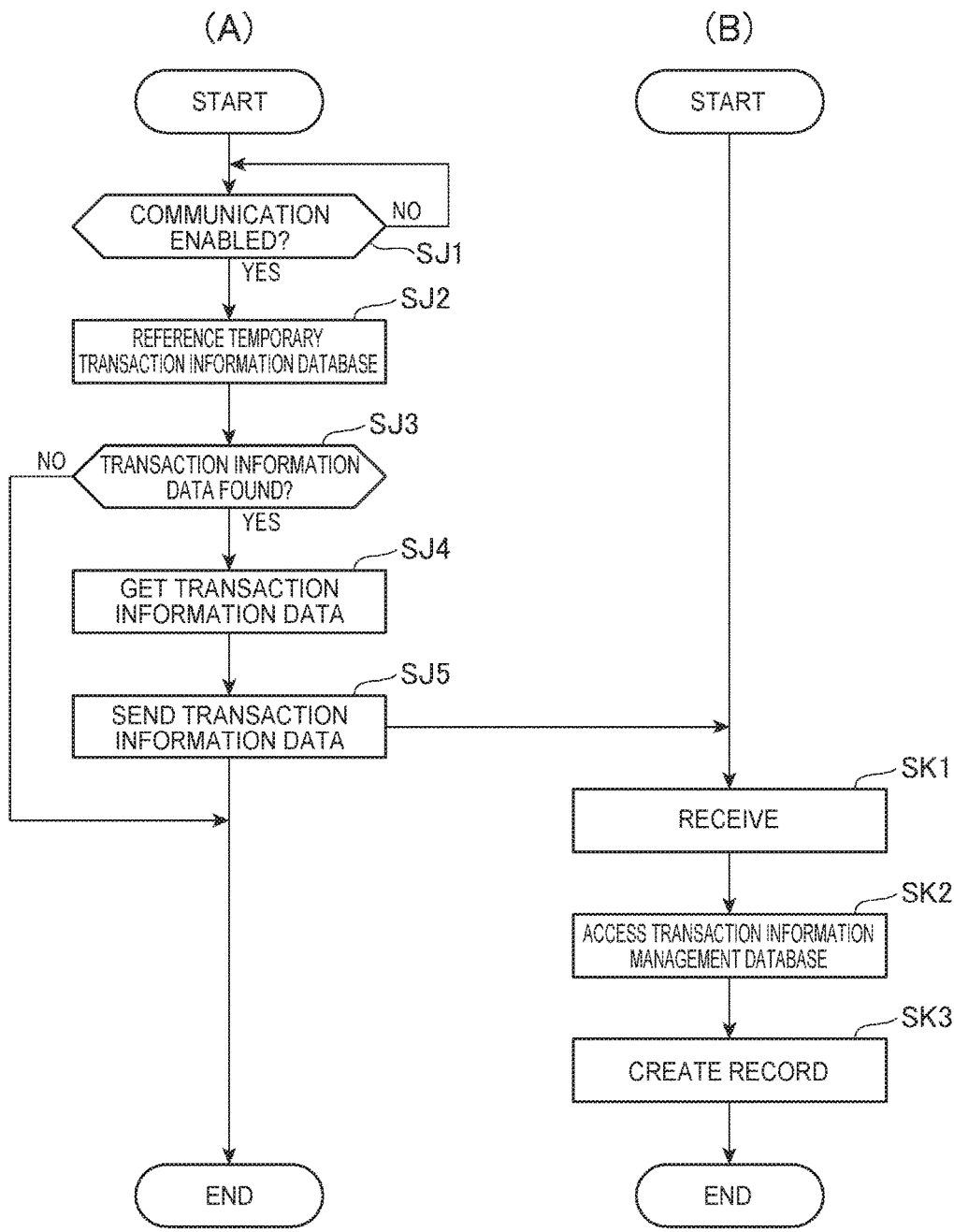
FIG. 9 is a flow chart of an operation of a POS terminal.

FIG. 9 is a flow chart of the operation of the POS terminal 10 and the control server 15 when the POS terminal 10 and control server 15 cannot communicate with each other and communication therebetween is then re-enabled. column (A) of FIG. 9 (shows the operation of the POS terminal 10, and column (B) shows the operation of the control server 15. Note that when the flow chart shown in column (A) of FIG. 9 starts, communication between the POS terminal 10 and the control server 15 is not possible.

As shown in column (A) of FIG. 9, when communication with control server 15 is disabled, the client function unit 501 of the POS terminal 10 monitors by a specific means if communication with the control server 15 has been enabled again (step SJ1).

If communication with the control server 15 is possible (step SJ1: YES), the client function unit 501 references the temporary transaction information database 524 (step SJ2).

Next, the client function unit 501 determines if new transaction information data has been stored (registered) in the temporary transaction information database 524 (step SJ3).

If at least one record of transaction information data was stored in the temporary transaction information database 524, a transaction was performed at the checkout counter L where the POS terminal 10 is located and the POS terminal 10 ran the transaction process while communication with the control server 15 was disabled.

If at least one record of transaction information data was not stored in the temporary transaction information database 524, a transaction was not performed at the checkout counter L where the POS terminal 10 is located while communication with the control server 15 was disabled.

If at least one record of transaction information data was not stored in the temporary transaction information database 524 (step SJ3: NO), the client function unit 501 ends the process.

If at least one record of transaction information data was stored in the temporary transaction information database 524 (step SJ3: YES), the client function unit 501 acquires all transaction information data stored in the database (step SJ4).

Next, the client function unit 501 controls the control device communication unit 53 and sends all acquired transaction information data to the control server 15 (step SJ5).

As shown in column (B) of FIG. 9, the server-side application execution unit 4011 of the server controller 40 of the control server 15 controls the server communication unit 42 to receive the transaction information data (if there is more than one record of transaction information data, each of the plural transaction information data records) (step SK1).

Next, the server-side application execution unit 4011 accesses the transaction information management database 414 stored by the server storage unit 41 (step SK2).

Next, based on each transaction information data record received in step SK1, the server-side application execution unit 4011 creates a record in the transaction information management database 414 relationally storing the transaction identification information, purchased product information, transaction amount information, transaction time information, and store ID (if there were plural records of transaction information data, creates a record for each transaction information data record) (step SK3).

As described above, transaction information data based on transactions that are performed while the POS terminal 10 cannot communicate normally with the control server 15 is cumulatively stored in the POS terminal 10, and is sent to the control server 15 after communication with the control server 15 is enabled again. Based on the received transaction information data, the control server 15 updates the transaction information management database 414. As a result, even when the POS terminal 10 and control server 15 cannot communicate, a record corresponding to the transaction information data based on the performed transaction is created without fail in the transaction information management database 414 of the control server 15.

As described above, a transaction processing system 1 (network system) according to this embodiment of the disclosure includes a control server 15 with a server function that connects to a global network GN, and a POS terminal 10 capable of communicating with the control server 15 through the global network GN.

The POS terminal 10 has a server-function unit 502 with a server function, and a client-function unit 501. When the server-function unit 502 having a server function can communicate normally with the control server 15, the client-function unit 501 communicates with the control server 15 as a client of the control server 15, and executes processes in conjunction with the control server 15. When normal communication with the control server 15 is not possible, the client-function unit 501 communicates with the server-function unit 502 as a client of the server-function unit 502, and executes processes in conjunction with the server-function unit 502.

Thus comprised, the POS terminal 10 can continue executing processes even when normal communication with the control server 15 is not possible by the client-function unit 501 changing the device with which it communicates from the control server 15 to the server-function unit 502. More specifically, in a system having a control server 15, and a POS terminal 10 that connects to the control server 15 through a global network GN, the POS terminal 10 can continue normal operations even when normal communication with the control server 15 is not possible.

In this embodiment of the disclosure, the control server 15 stores a server-side product master database 411 (server-side data). The POS terminal 10 stores a control device-side product master database 521 that can be referenced by the server-function unit 502, and is synchronized with the server-side product master database 411 when the POS terminal 10 can communicate normally with the control server 15. When able to communicate normally with the control server 15, the client-function unit 501 of the POS terminal 10 communicates with the control server 15, and executes processes based on the processing results of the control server 15 using the server-side product master database 411. When unable to communicate normally with the control server 15, the client-function unit 501 of the POS terminal 10 communicates with the server-function unit 502, and executes processes based on the processing result of the server-function unit 502 using the control device-side product master database 521.

Thus comprised, the client-function unit 501 can continue executing identical identical transaction-related processes using identical master databases whether communication is switched from the control server 15 to the server-function unit 502.

In this embodiment of the disclosure, the server-side product master database 411 and control device-side product master database 521 are both master databases storing transaction-related information. When normal communication with the control server 15 is possible, the client-function unit 501 of the POS terminal 10 communicates with the control server 15 and executes transaction-related processes based on the process results of the control server 15 using the server-side product master database 411. When normal communication with the control server 15 is not possible, the client-function unit 501 of the POS terminal 10 communicates with the server-function unit 502, and executes transaction-related processes based on the process results of the server-function unit 502 using the control device-side product master database 521.

Thus comprised, the client-function unit 501 can continue executing identical identical transaction-related processes using identical master databases whether communication is switched from the control server 15 to the server-function unit 502.

In this embodiment of the disclosure the POS terminal 10 has a recording function for recording on roll paper (recording media). The client-function unit 501 of the POS terminal 10 produces receipts based on the transaction processes.

Thus comprised, a transaction processing system 1 having a POS terminal 10 configured to execute a transaction process and produce receipts, and a control server 15 that connects to the POS terminal 10 through a global network GN, can appropriately handle events in which the POS terminal 10 cannot communicate normally with the control server 15.

In this embodiment of the disclosure, the client-function unit 501 of the POS terminal 10 monitors the communication response speed of the control server 15, and determines normal communication with the control server 15 is not possible and switches communication from the control server 15 to the server-function unit 502 if the communication response speed is slower than a specific speed.

Thus comprised, the client-function unit 501 can appropriately detect when normal communication with the control server 15 is not possible.

After switching to the server-function unit 502, the client-function unit 501 of the POS terminal 10 in this embodiment of the disclosure monitors the communication response speed of the control server 15, switches from the server-function unit 502 to the control server 15 if the communication response speed of the control server 15 is greater than a specific speed.

Thus comprised, the client-function unit 501 communicates with the control server 15 when able to communicate with the control server 15.

When communicating with the control server 15, the client-function unit 501 of the POS terminal 10 in this embodiment of the disclosure monitors the communication response speed of the server-function unit 502, and does not switch the communication connection if the communication response speed of the server-function unit 502 is below a specific speed.

Thus comprised, changing the communication connection when not necessary is prevented.

When communicating with the control server 15, the client-function unit 501 of the POS terminal 10 in this embodiment of the disclosure does not monitor the communication response speed of the server-function unit 502 when the communication response speed of the control server 15 is greater than a specific speed.

Thus comprised, unnecessarily executing processes related to monitoring the communication response speed of the server-function unit 502 can be prevented, the processor load reduced, and processing efficiency improved.

The disclosure is described above with reference to a preferred embodiment thereof, but the disclosure is not limited thereto and can be modified and adapted in many ways without departing from the scope of the accompanying claims.

For example, the POS terminal 10 in the foregoing embodiment has a recording function for recording on recording media, and the POS terminal 10 produces receipts based transaction processes. However, a configuration in which a recording device with a recording function is connected to the POS terminal 10, and receipts are produced by the recording device, is also conceivable.

In this example, the server-side data and control device-side data are product masters. However, the data may be any data that requires synchronization.

An example of the transaction processing system 1 according to the disclosure applied to a store system is described above, but the facilities in which the transaction processing system 1 is used are not limited to stores.

The devices of the transaction processing system 1 may also communicate using any desirable method.

In addition, the POS terminal 10 records by a thermal recording method in the foregoing example, but the recording method is not so limited.

The function blocks described above with reference to the figures can be embodied as desired by the cooperation of hardware and software, and do not suggest a specific hardware configuration.

The function blocks shown in the accompanying function block diagrams illustrate the functional configurations of the devices, but the specific embodiments thereof are not so limited. More specifically, there is no requirement for hardware embodiments of the function blocks shown in the figures, and a configuration in which the functions of plural functional parts are rendered by a single processor executing one or more programs is obviously conceivable. Some functions embodied by software in the foregoing embodiment may also alternatively be embodied by hardware, and some functions embodied by hardware in the foregoing embodiment may also alternatively be embodied by software.

The disclosure being thus described, it will be obvious that it may be varied in many ways. Such variations are not to be regarded as a departure from the spirit and scope of the disclosure, and all such modifications as would be obvious to one skilled in the art are intended to be included within the scope of the following claims.

What is claimed is:

1. A transaction processing system comprising:
a control server configured to operate as a first server; and
a printer comprising one or more processors configured to
(1) communicate with the control server through the global network, (2) operate as one or more of a client, (3) operate as a second server, and (4) be provided at a checkout counter;

wherein the printer, when configured to operate as the client, is operable to communicate with the control server and:
- if the client of the printer can communicate normally with the control server, the client executes a process with the control server as a client of the control server, and
- if the client of the printer cannot communicate normally with the control server, the client communicates with the second server of the printer and executes a process with the second server as a client of the second server, the second server being locally stored on the printer.

2. The network system described in claim 1, wherein:
the client of the printer is embodied by reading and running a web browser installed on the printer.

3. The network system described in claim 1, wherein:
the control server stores server-side data;
the printer stores control device-side data that can be synchronized with the server-side data and referenced by the second server of the printer when normal communication with the control server is enabled; and
the client of the printer:
- when able to communicate normally with the control server, communicates with the control server and executes another process based on the process result of the control server using the server-side data, and
- when not able to communicate normally with the control server, communicates with the second server of the printer and executes another process based on the process result of the second server using the printer-side data.

4. The network system described in claim 3, wherein:
the server-side data and the control device-side data are master databases storing transaction-related information; and
the client of the printer:
- when able to communicate normally with the control server, communicates with the control server and executes a transaction-related process based on the process result of the control server using the server-side data, and
- when not able to communicate normally with the control server, communicates with the second server of the printer and executes a transaction-related process based on the process result of the second server using the control device-side data.

5. The network system described in claim 4, wherein:
the printer has a printer for recording on a recording medium; and
the client of the printer produces a receipt based on the transaction-related process.

6. The network system described in claim 5, wherein:
the printer has a device communicator; and
an input/output device is connected to the device communicator of the printer.

7. The network system described in claim 1, wherein:
the client of the printer monitors the communication response speed of the control server, and when the communication response speed is slower than a specific speed, determines normal communication with the control server is not possible, and switches communication from the control server to the second server of the printer.

8. The network system described in claim 7, wherein:
after switching communication to the second server of the printer, the client of the printer monitors the communication response speed of the control server, and when the communication response speed is faster than a specific speed, switches communication from the second server of the printer to the control server.

9. The network system described in claim 7, wherein:
while communicating with the control server, the client of the printer monitors the communication response speed of the second server of the printer, and when the communication response speed of the second server of the printer is slower than a specific speed, does not change the communicating device.

10. The network system described in claim 7, wherein:
while communicating with the control server, the client of the printer does not monitor the communication response speed of the second server of the printer when the communication response speed of the control server is faster than a specific speed.

11. A control method of a transaction processing system having a control server configured to operate as a first server, and a printer configured to communicate with the control server through a global network,
wherein the printer is configured to operate as one or more of a client and a second server,
wherein the printer is provided at a checkout counter,
wherein, when the printer is configured to operate as the client, is operable to communicate with the control server and:
- if the client of the printer can communicate normally with the control server, the client executes a process with the control server as a client of the control server, and
- if the client of the printer cannot communicate normally with the control server, the client communicates with the second server of the printer and executes a process with the second server as a client of the second server, the second server being locally stored on the control device.

12. A printer comprising:
a communicator configured to communicate through a global network with a control server configured to operate as a first server;
wherein the printer is configured to operate as one or more of a client and a second server,
wherein the printer is provided at a checkout counter,
wherein the printer, when configured to operate as the client, is operable to communicate with the control server and:
- if the client of the printer can communicate normally with the control server, the client executes a process with the control server as a client of the control server, and
- if the client of the printer cannot communicate normally with the control server, the client communicates with the second server of the printer and executes a process with the second server as a client of the second server, the second server being locally stored on the control device.

13. The printer described in claim 12, wherein:
the client of the printer is embodied by reading and running an installed web browser.

14. The printer described in claim 12, wherein:
the printer stores control device-side data that can be synchronized with the server-side data stored by the control server when able to communicate normally with the control server, and can be referenced by the second server of the printer; and the client of the printer:
- when able to communicate normally with the control server, communicates with the control server and executes another process based on the process result of the control server using the server-side data, and
- when not able to communicate normally with the control server, communicates with the second server of the printer and executes another process based on the process result of the second server using the control device-side data.

15. The printer described in claim 14, wherein:

the server-side data and the control device-side data are master databases storing transaction-related information; and the client of the printer:
- when able to communicate normally with the control server, communicates with the control server and executes a transaction-related process based on the process result of the control server using the server-side data, and
- when not able to communicate normally with the control server, communicates with the second server of the printer and executes a transaction-related process based on the process result of the second server using the control device-side data.

16. The printer described in claim 15, wherein:

the printer has a printer for recording on a recording medium; and the client of the printer produces a receipt based on the transaction-related process.

17. The printer described in claim 16, wherein:

the printer has a device communicator; and an input/output device is connected to the device communicator.

* * * * *